United States Patent [19]

Fitchmun et al.

[11] Patent Number: 5,236,776
[45] Date of Patent: Aug. 17, 1993

[54] THERMOPLASTIC THERMOFORMABLE COMPOSITE MATERIAL AND METHOD OF FORMING SUCH MATERIAL

[75] Inventors: Douglas R. Fitchmun, Woodland Hills; Stuart E. Jenkins, Thousand Oaks, both of Calif.

[73] Assignee: Medical Materials Corporation, Camarillo, Calif.

[21] Appl. No.: 651,957

[22] Filed: Feb. 7, 1991

[51] Int. Cl.$^5$ ............... B32B 27/04; B32B 7/00
[52] U.S. Cl. ................... 428/246; 428/247; 428/260; 428/282; 428/286; 428/290
[58] Field of Search ............. 428/220, 224, 248, 246, 428/247, 260, 282, 286, 290; 36/71, 44

[56] References Cited

U.S. PATENT DOCUMENTS 4,379,802  4/1983  Weaver et al. ............ 428/285
4,778,717  10/1988  Fitchmun ................ 428/247

Primary Examiner—B. Hamilton Hess
Assistant Examiner—Richard C. Weisberger
Attorney, Agent, or Firm—Ellsworth R. Roston; Charles H. Schwartz

[57] ABSTRACT

A thermoplastic thermoformable resin material defines a core of a thermoformable thermoplastic composite material. First and second layers of fabric material are disposed against opposite sides of the core. An additional layer of a fabric material is positioned on the first fabric layer to impart a particular color to the composite material. A resin envelopes and impregnates the different fabric layers and bonds these layers to the core. The fabric layers have a total thickness sufficient to impart strength and rigidity to the fabric material. The core is sufficiently thick to provide for a shaping of the composite material at an elevated temperature to any desired configuration without any rippling or buckling of the composite material. Additional layers of a thermoplastic thermoformable resin material may be disposed on the outer layers of the fabric material. They impregnate the fabric layers, provide a continuity with the core and provide a smooth external surface to the composite material. The core and the additional resin layers may be an acrylic. The two fabric layers may be made from carbon and may be woven or formed from discrete particles. The additional fabric layer may be woven from a warp and a woof. The warp may be made from a high strength fiber and the woof may be formed from a colored fiber. Another embodiment of the composite material may be formed from the core, one additional layer of the fabric material and the colored fabric. The invention also relates to methods of forming the composite material.

33 Claims, 2 Drawing Sheets

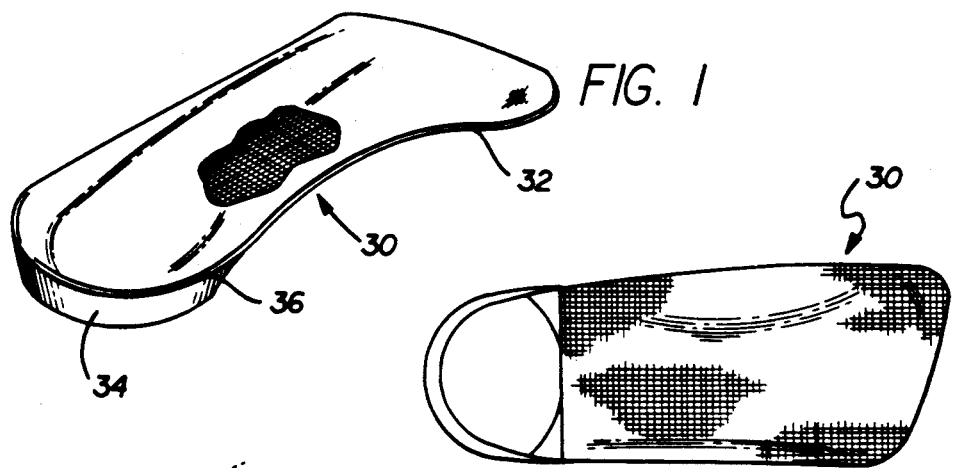
FIG. 1
FIG. 2
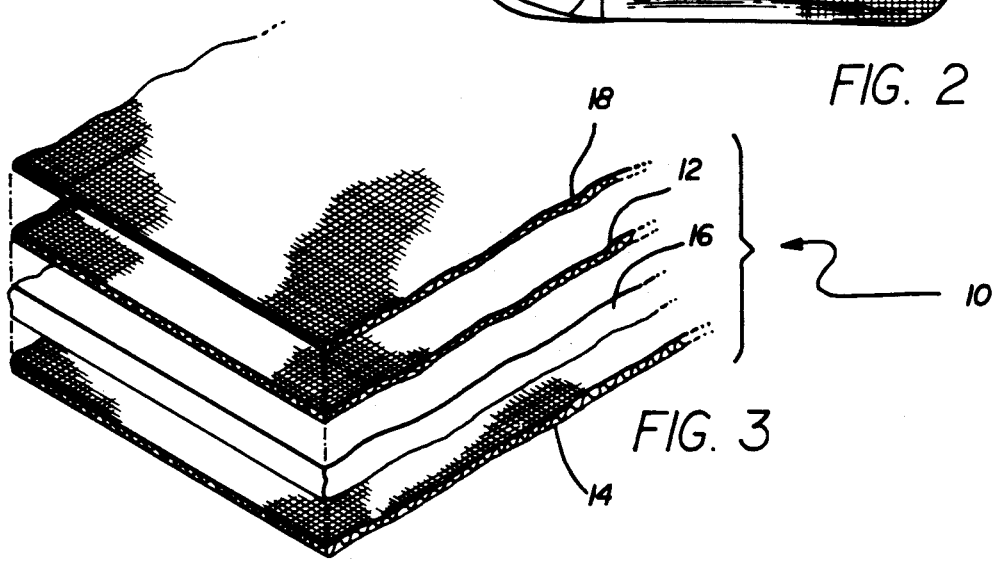
FIG. 3
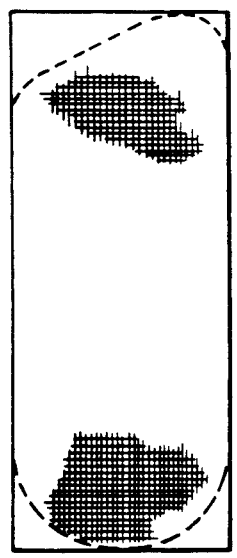
FIG. 5
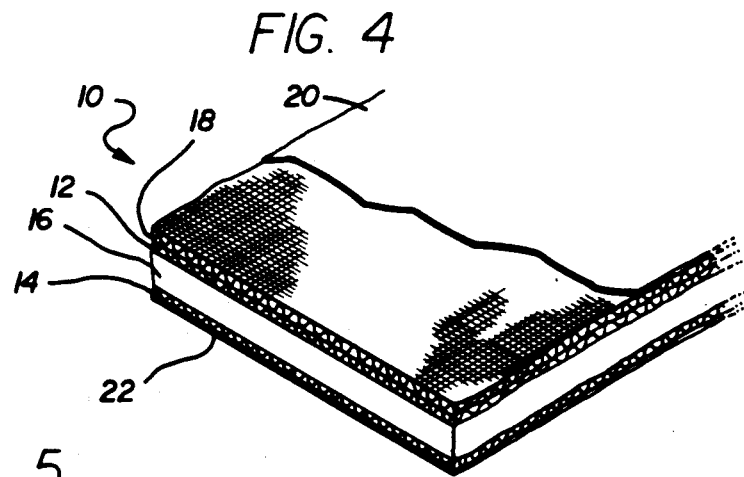
FIG. 4

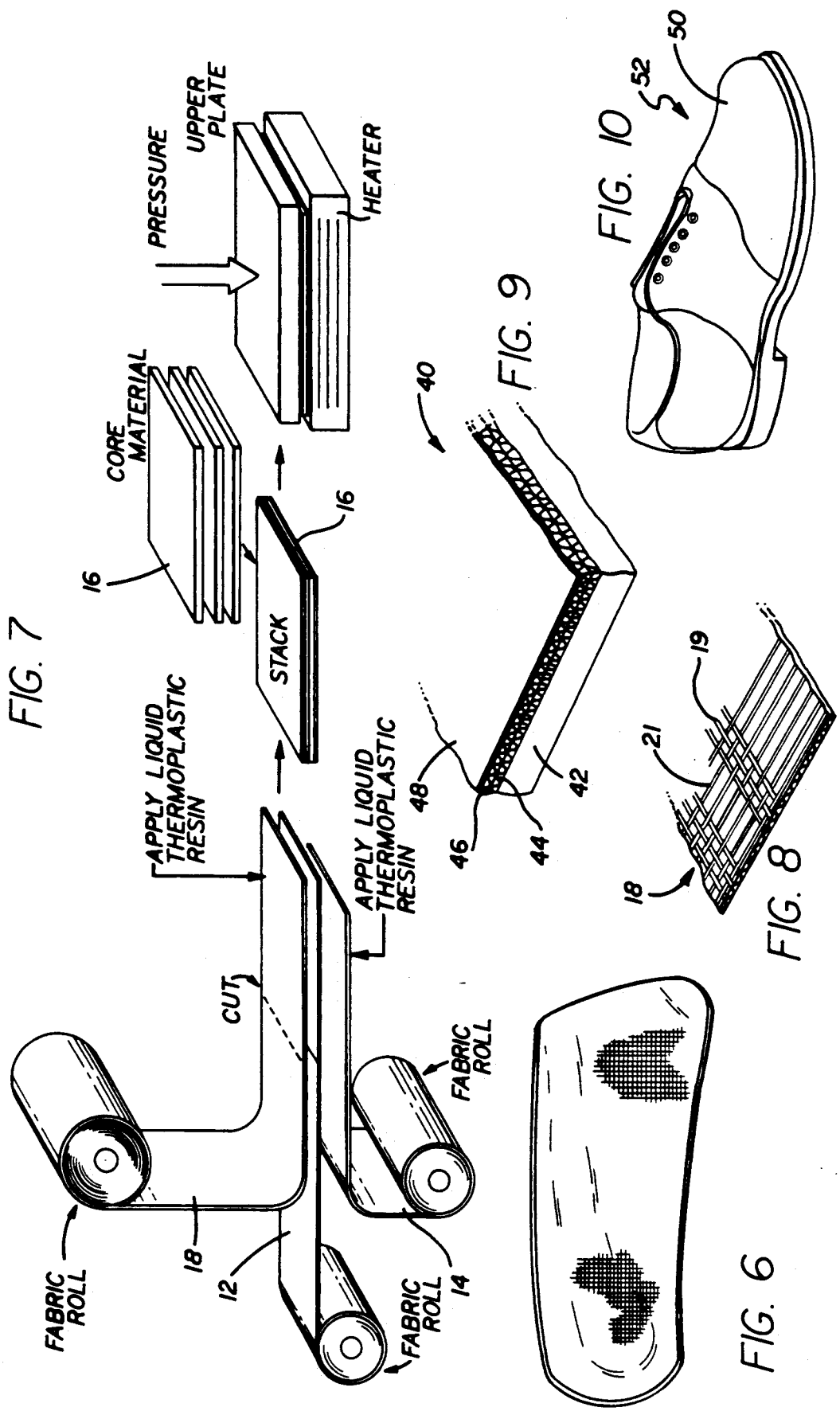

THERMOPLASTIC THERMOFORMABLE COMPOSITE MATERIAL AND METHOD OF FORMING SUCH MATERIAL

This invention relates to a thermoformable thermoplastic composite material which is strong and light and which is capable of being thermally deformed to any desired shape without buckling or rippling of the composite material. The invention also relates to a thermoformable thermoplastic composite material which is provided with the above properties and which can be formed in any desired color without compromising any of such properties. The invention also relates to methods of forming such a thermoformable thermoplastic composite material.

It is often desirable to form a sheet of plastic material into a complex shape without any rippling or buckling of the material. It is also desirable to make such sheet as light (from a weight standpoint), thin and strong as possible. It is also desirable to form a sheet with the above characteristics into the complex shape in a relatively simple process so that the costs of providing the complex shape in the sheet are low and so that the yield of the final product is high.

A sheet with the properties discussed may have a wide variety of different uses. For example, it may be shaped to conform to the shape a foot. Alternatively, the sheet may be shaped to provide an arch support in a shoe for a person's foot. As another example, the sheet may be shaped to be disposed as a spring element in the sole of a wearer's shoe. Although the examples have been limited to uses in shoes, this is only one of a number of different fields or areas in which such material can be used.

Thermoplastic materials have been used to provide sheets with the properties discussed above. To obtain a desired shape, a mold is provided with the desired shape. The thermoplastic material is then formed into the desired shape by applying heat and pressure to the thermoplastic material to move the material into the mold and to have the material adopt the configuration of the mold. Suitable thermoplastic materials for forming into complex shapes may be acrylics, polypropylenes and polyethylenes.

Thermoplastic materials are advantageous because they can be reshaped if it is desired to change the configuration somewhat after the material has been initially shaped through the application of heat and pressure. However, thermoplastic materials are distinctly disadvantageous in that they have to be provided with a considerable thickness in order to provide the necessary rigidity in such applications as orthotics. For example, thicknesses of 0.120" to 0.200" may be required. Unfortunately, such thick materials are heavy and are generally too thick to be disposed in foot gear. Furthermore, the thermoplastic materials are not as durable and resistant to breaking as would otherwise be required. The thermoplastic materials also sometimes buckle and ripple when they are transformed into complex shapes.

Thermosetting materials have also been used to provide complex shapes such as for footwear and orthotic applications. An advantage of a thermosetting material is that it can be made quite thin to obtain the desired shape. For example, the thickness of the thermosetting material may be in the order of 0.065" to 0.080". One problem with shaping thermosetting materials into complex shapes is that the thermosetting materials have to be shaped properly the first time. The reason is that the thermosetting materials cannot be reshaped after they have been heated to a temperature for initially shaping the material. This problem has severely limited the use of the thermosetting material to provide complex shapes. Another problem is that the thermosetting material tends to be heavy even though it is thin.

Until recently, because of the problems discussed above for thermosetting materials, complex shapes such as for orthotic inserts have generally been formed from thermoplastic materials such as acrylics and polypropylenes. The orthotic inserts have been formed by initially making a plaster mold from the patient's foot. This plaster mold has formed a negative image of the patient's foot. A positive mold has then made from the negative plaster mold. Thermoplastic material has then been transformed into the desired shape by using heat and pressure to conform the thermoplastic material to the positive mold.

U.S. Pat. No. 4,778,717 issued to me on Oct. 18, 1988, for a "Thermoplastic Thermoformable Composite Material" and assigned of record to the assignee of record of this application discloses and claims a composite thermoplastic material which can be easily formed, and even reformed if necessary, at elevated temperatures to any desired complex shape. The composite material is light and strong and is able to be thermally deformed, and even reformed, to any desired shape without buckling or rippling. U.S. Pat. No. 4,778,717 is made of reference to provide a background for the improvement constituting this invention and also to complete any disclosure in this application of the construction and formation of the composite material.

The composite material of U.S. Pat. No. 4,778,717 is formed from a core material of a thermoplastic resin material and a pair of layers of fabric material disposed on the opposite sides of the core material. The core material envelopes and impregnates the layers of the fabric material and bonds the layers of the core material to the fabric material. The layers of the fabric material have a total thickness sufficient to impart strength and rigidity to the composite material. The core is of a sufficient thickness to provide for a shaping of the composite thermoplastic material at an elevated temperature to any desired shape or configuration without any rippling or buckling of the fabric material. The composite material of U.S. Pat. No. 4,778,717 has received widespread acceptance for orthotics.

Since the layers of the fabric material in the composite material may be made from carbon fibers or hybrids of carbon and glass, the composite material tends to have a black color. However, it is often desired for the composite material to have a particular color other than black. This is particularly true when the composite material is to be disposed externally. For example, when the composite material is shaped for use as a supporting strap on a ski boot, it may be desired to have the strap of a particular color for aesthetic or fashionable purposes.

This invention provides a composite material with substantially the same properties as the composite material of U.S. Pat. No. 4,778,717 but with any desired color. In this way, the composite material is not only functional in the same respects as the composite material of U.S. Pat. No. 4,778,717 but is also aesthetic without losing any of its functionality. The composite material of this invention accordingly constitutes an improvement over the composite material disclosed and claimed in U.S. Pat. No. 4,778,717.

In one embodiment of the invention, a thermoplastic thermoformable resin material defines a core of a thermoformable thermoplastic composite material. First and second layers of fabric material are respectively disposed against opposite sides of the core. An additional layer of a fabric material is positioned on the first fabric layer to impart a particular color to the composite material and to impart additional strength and rigidity to the material. A resin envelopes and impregnates the different fabric layers and bonds these layers to the core.

The different fabric layers have a total thickness sufficient to impart strength and rigidity to the composite material. The core is of a sufficient thickness to provide for a shaping of the composite material at an elevated temperature to any desired configuration without any rippling or buckling of the fabric material.

Additional layers of a thermoplastic thermoformable resin material may be disposed on the outer layers of the fabric material. They impregnate the fabric layers, provide a continuity with the core and provide a smooth external surface to the composite material. The core and the additional resin layers may be an acrylic. The two fabric layers may be made from carbon or a hybrid of carbon and glass and may be woven or formed from discrete particles.

The additional fabric layer may be woven from a warp and a woof. The warp may be made from a high strength fiber and the woof may be formed from a colored fiber. Another embodiment of the invention may be formed from the core, an additional layer of the fabric material and the layer of the colored fabric. The invention also relates to methods of forming the composite material.

In the drawings:

FIG. 1 is a schematic perspective view of a completed orthotic insert constructed from a thermoplastic thermoformable composite material in accordance with the teachings of this invention;

FIG. 2 is a bottom plan view of the orthotic insert of FIG. 1;

FIG. 3 is an enlarged exploded fragmentary schematic perspective view of the various materials used to form the thermoplastic thermoformable composite material constituting this invention;

FIG. 4 is a fragmentary schematic perspective view of the thermoplastic composite material of this invention in sheet form;

FIG. 5 is a bottom plan view illustrating a portion of the sheet material of FIG. 4 after trimming of the sheet material to a desired configuration but prior to the formation of the sheet material into the complex shape shown in FIGS. 1 and 2;

FIG. 6 is a bottom plan view illustrating the forming of the sheet material of FIG. 5 into the complex shape shown in FIGS. 1 and 2 but prior to the other steps to complete the orthotic insert shown in FIGS. 1 and 2;

FIG. 7 is a view schematically illustrating a method of forming the thermoplastic sheet material shown in FIG. 4;

FIG. 8 is a schematic perspective view illustrating the construction of one of the layers of fabric material included in the composite material to impart a particular color to one surface of the composite material;

FIG. 9 is a schematic perspective view of a composite material constituting another embodiment of this invention; and FIG. 10 is a schematic perspective view of a shoe in which the composite material of FIG. 9 is used as the top of the shoe.

FIG. 4 illustrates a thermoplastic thermoformable composite material generally indicated at 10 and constituting one embodiment of this invention. The composite material 10 includes a pair of layers 12 and 14 of a fabric material, preferably woven. The material for the fabric layers 12 and 14 may be made from fibers of a suitable material such as carbon, glass or aramid or a combination of these materials. The layers 12 and 14 may be formed from woven fibers, unidirectional and chopped fibers or continuous random strand mats. It will be appreciated that other materials or combinations of materials may also be used. Each of the layers 12 and 14 may be relatively thin. For example, the layers 12 and 14 may have a suitable thickness in the order of eight thousandths of an inch (0.008") to nine thousandths of an inch (0.009").

The composite material 10 also includes a core 16 made from a suitable thermoplastic thermoformable material such as a resin. A suitable resin may be an acrylic although other thermoplastic composite materials may be used. The core 16 is disposed between the layers 12 and 14 of the fabric material. The thickness of the core 16 is considerably greater than the total thickness of the layers 12 and 14 of the fabric material. For example, the total thickness of the core 16 and the layers 12 and 14 of the fabric material may be approximately seventy thousandths of an inch (0.070") when each of the layers 12 and 14 has a thickness in the order of 0.008" to 0.009".

The composite material 10 also includes an additional layer 18 of a fabric material. This material preferably is woven in a relatively loose weave so that it may be impregnated with the material from the core 14 so as to be bonded to the core. The woven material may be provided with a warp and a woof and may be provided with a particular color to impart this color to one surface of the composite material 10. For example, the additional layer 18 of the fabric material may constitute a lame in which the warp constitutes a fiber 19 with strong properties and the woof constitutes a fiber 21 with the particular color. This may be seen in FIG. 8.

The fiber 19 may illustratively be made from a suitable material such as nylon and may be formed from a flat strip. The fiber 21 may be made from a polyester having a sufficiently high melting temperature to prevent softening during the processing of the composite material. Other materials such as cotton, nylon, acrylic, orlon or silk or combinations of these materials may also be used for the fiber 21 provided that they have a higher melting temperature than that of the core 16. The additional layer 18 of fabric material may be relatively thin. For example, the additional layer 16 of the fabric material may have a suitable thickness such as approximately four thousandths of an inch (0.004"). It will be appreciated that an additional layer of a fabric material may also be disposed adjacent to the layer 14 of the fabric material. This additional layer may have the same color as, or a different color than, the layer 18 of fabric material.

As a first step in forming the composite material 10, the layer 12 of the fabric material is disposed against the core 16 on one side of the core. The additional layer 18 of the fabric material is then disposed on the layer 12 of fabric material. The layer 14 of fabric material is thereafter disposed against the core 16 on the other side of the core. As will be seen in FIG. 7, the layers 12, 14, 16 and 18 may be disposed in the relationship described above by unwinding the core 16 and the layers 12, 14 and 18 from rolls of material on a synchronized basis.

Although a preferred embodiment of the composite material has been described above, it will be appreciated that the thickness of the different layers of material can be varied through a wide range without departing from the scope of the invention. For example, the total thickness of all of the different layers of fiber or fabric relative to the total thickness of the composite material 10 may be between approximately five percent (5%) and one third (⅓). The thickness or volume of all of the layers 12, 14 and 18 of the fiber or fabric relative to the total thickness of the composite material 10 is dependent upon the use to be made of the composite material. For example, when the composite material is to be used for an orthotic insert, the total thickness of all of the layers 12, 14 and 18 of fabric or fiber relative to the total thickness of the composite material 10 may be approximately twenty five percent (25%) as described above.

Additional layers 20 and 22 (FIGS. 4 and 7) of a liquid thermoplastic thermoformable resin material such as an acrylic may be respectively disposed adjacent to the layers 18 and 14 of the fabric material. These additional layers may be quite thin. The additional layers of the resin material may be quite thin such as in the order of three fourths of one thousandth of an inch (0.00075") thick to one and one half thousandths of an inch (0.0015") thick. The material of the additional layers 20 and 22 of resin material may be the same as, or different from, the material of the core 16. However, if the material of the layers 20 and 22 is different from the material of the core 16, the different materials have to be compatible so that they will form a unitary whole when extruded or molded into the composite material.

During the formation of the different layers of the fabric materials and the resin materials into the composite material 10, as by laminating or molding the different layers, the additional layers 20 and 22 tend to facilitate the impregnation and encapsulation of the layers 12, 14 and 18 of fabric material. Furthermore, they tend to cover the layers 14 and 18 and provide a smooth external surface to these layers. This is particularly important if there is any slight rippling or buckling in any of the layers 12, 14 and 18 of fabric material during the formation of the composite material 10 into a desired complex shape.

The layers 12, 14, 18, 20 and 22 of the fabric material and the core 16 are then laminated into a thin sheet of the composite material at a suitable temperature and pressure as shown in FIG. 7. The particular temperature and pressure are dependent upon a number of parameters including the specific materials used for each of the layers 12, 14, 18, 20 and 22 and the particular material used for the core 16. The particular temperature and pressure are also dependent upon the specific thickness of each of the layers 12, 14, 18, 20 and 22 and the core 16 and the thickness of each of the layers relative to the thickness of the other layers. Although the formation of the composite material 10 by a laminating process is preferred, the composite material may also be suitably formed as by a molding process.

As an illustrative example, assume that the core 16 is approximately fifty thousands of an inch (0.050") thick and the composite material 10 is approximately seventy five thousandths of an inch (0.075") thick. Further assume that the core 16 is an acrylic and the layers 12 and 14 of fabric material are made from a carbon woven fabric and the layer 18 of fabric material is made from a lame as described above. Under such circumstances, the composite material 10 may be initially laminated for a period of approximately two (2) to three (3) minutes at a pressure progressively increasing between zero pounds per square inch (0 psi) and ten pounds per square inch (10 psi). The composite material 10 may then be laminated for two (2) to three (3) minutes at a pressure progressively increasing to approximately ninety pounds per square inch (90 psi). The composite material may subsequently be laminated for approximately thirty (30) minutes at a pressure progressively increasing to a value in the range of three hundred to four hundred pounds per square inch (300–400 psi).

After the composite material 10 has been laminated as described in the previous paragraph, the composite material may be annealed. The annealing cycle may be dependent upon the parameters of the composite material such as those specified two (2) paragraphs previously. For example, under the circumstances described in the previous paragraph, an annealing cycle may be provided for a period of approximately twenty four (24) hours. In this annealing cycle, the composite material may be annealed at a suitable temperature such as approximately 180° F. for a suitable period such as approximately eight (8) hours, then at a suitable temperature such as approximately 210° F. for a suitable period such as approximately four (4) hours, thereafter at a suitable temperature such as approximately 250° F. for a suitable time such as approximately four (4) hours and finally at a suitable temperature such as approximately 260° F. for the remaining period such as approximately ten (10) hours. The composite material 10 may then be cooled to ambient temperatures.

The annealing of the composite material 10 after the lamination of the composite material under heat and pressure offers certain important advantages. By annealing the composite material 10, moisture in the composite material 10 is eliminated. This prevents pockets of foreign material such as water from remaining in the composite material 10 after the formation of the composite material. Such foreign pockets are undesirable because they limit the ability of the composite material to be formed into complex shapes without rippling or bucking. The annealing of the composite material is also advantageous because it eliminates monomers unreacted during the extrusion process and causes all of such unreacted monomers to be converted to polymers to be diffused away.

When the composite material 10 has been formed into sheets as described above and is thereafter to be converted into a complex shape, the material may be disposed in a mold having the desired shape and may be subjected to a suitable temperature and pressure to move the sheet into conformity with the shape of the mold. The composite material 10 has certain distinct advantages while it is being formed into the desired shape and after it has been so formed. During such formation, the layers 12, 14 and 18 of the fabric material provide a body to the composite material. The core 16 provides for a movement between the layers 12 and 18 on one side of the core independently of the movement of the layer 14 on the other side of the core.

In this way, the composite material 10 can be formed into any desired shape without any rippling or buckling of the composite material or the fabric material. This is important in insuring that the composite material 10 will occupy only a minimal amount of space and will be comfortable to the user such as when it is formed into an orthotic insert. It is also important in insuring that the composite material 10 will have an optimal strength, stiffness and rigidity after it has been formed into the desired shape.

The strength, stiffness and rigidity of the composite material 10 may be controlled dependent upon the total thickness of the layers 12, 14 and 18 of the fabric material relative to the total thickness of the composite material. For example, as the total thickness of the layers 12, 14 and 18 of the fabric material increases relative to the total thickness of the composite material 10, the stiffness, strength and rigidity of the composite material 10 tend to be enhanced while the ability of the composite material to be conformed to complex shapes tends to be reduced.

When the composite material 10 is formed as described above, the liquid material of the layers 20 and 22 encapsulates and impregnates the fabric or fibers in the layers 12, 14 and 18 of the fabric material and bonds the fabric or fibers to the core. The encapsulation and impregnation of the fabric or fibers in the layer 18 of fabric material tend to occur independently of the encapsulation and impregnation of the fabric or fibers in the layer 12 of fabric material even though the layer 18 of the fabric material is disposed adjacent to the layer 12 of the fabric material. Actually, the independent encapsulation and impregnation of the layers 12 and 18 of fabric material tend to enhance the strength, rigidity and stiffness of the composite material 10 even though the layer 18 is quite thin. The color provided by the additional layer 18 of fabric material is not impaired in any way by the encapsulation and impregnation of such layer during the laminating process.

FIGS. 1 and 2 schematically show an orthotic insert generally illustrated at 30. The orthotic insert includes a base member 32 made from the composite material 10 which is transformed to the desired shape after being provided in sheet form. A heel portion 34 is attached to the base member 32. The heel portion 34 may be made in a conventional manner. The heel portion 34 may be molded from a rigid plastic material to operate as a heel support. A soft durable covering 36 covers the base member 32. The soft durable covering material 36 may be made from any suitable leather-like material to provide for a comfortable surface adjacent the foot of the orthotic user.

FIG. 1 also illustrates that the base member 12 formed from the composite material 10 has a complex shape conforming to the bottom surface of the foot of the user of the orthotic insert 30. Each such orthotic insert 30 has to be made for an individual user because of its complex shape. In general, such orthotic inserts are provided by medical personnel who specialize in fitting such inserts to a user to provide the proper support to the user during various activities.

Typically, plaster molds of the user's feet are made and sent to a laboratory. The laboratory then makes castings from the molds. The castings thereby represent the bottoms of the user's feet. Orthotic inserts are then formed to provide for the proper inserts conforming to the bottom of the user's feet. These orthotic inserts constitute finished products. However, it is important that these orthotic inserts be post formable so that adjustments in their shape can be made in the field if there are any problems with the inserts after the inserts have been applied to the user's feet. The formation of the base member 32 from the composite material 10 allows for such port forming.

FIG. 9 is a schematic perspective view of a composite material generally indicated at 40 and constituting another embodiment of the invention. The composite material 40 includes a core 42 corresponding to the core 16 in the previous embodiment, a layer 44 of a fabric material corresponding to the layer 12 of fabric material in the previous embodiment and an additional layer 46 of a fabric material corresponding to the additional layer 18 of fabric material in the previous embodiment. The embodiment shown in FIG. 9 may also include a layer 48 of a thermoplastic resin material corresponding to the layer 2 of thermoplastic resin material in the previous embodiment. As will be seen, the embodiment shown in FIG. 9 does not include a layer corresponding to the layer 14 of fabric material or a layer of thermoplastic resin material corresponding to the layer 22 of thermoplastic resin material.

The composite material 40 may be formed in the same manner as the composite material 10. Furthermore, the resin material in the core 42 and in the thermoplastic layer 48 of the composite material 40 may encapsulate and impregnate the layers 44 and 46 of fabric material and bond the layers 44 and 46 to the core. The total thickness of the layers 44 and 46 of fabric material may be in the order of approximately three percent (3%) to one sixth of the total thickness of the composite material 40.

The composite material 40 shown in FIG. 9 may have certain important uses. Since layers corresponding to the layers 14 and 22 in the previous embodiment are not included in the composite material 40 of FIG. 9, the composite material is not as strong or as stiff as the composite material 10 constituting the previous embodiment. However, the composite material 40 is sufficiently strong and stiff to be used as the top 50 of a shoe generally indicated at 52 in FIG. 10. The decreased stiffness of the composite material 40 actually may be considered to constitute an advantage when it is used as the top 50 of the shoe 52.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

We claim:

1. A thermoplastic thermoformable composite material for shaping into a complex form without rippling or buckling, including,
    a core of a thermoplastic material,
    two layers of a fabric material respectively positioned at opposite sides of the core of the thermoplastic material,
    an additional layer of a fabric material of a particular color positioned on one of the layers of the fabric material,
    thermoplastic material enveloping and impregnating the two layers of the fabric material and the additional layer of the fabric material and bonding the layers of the fabric material to the thermoplastic material in the core, the cumulative fiber thicknesses of the two layers of fabric material and the additional layer of the fabric material representing less than one third (⅓) of the thickness of the thermoplastic composite material, the layers of the fabric material imparting stiffness and rigidity to the thermoplastic thermoformable composite material and the core of the thermoplastic material for a shaping the thermoplastic thermoformable composite material into the complex form without rippling or buckling of the thermoplastic composite material.

2. A thermoplastic thermoformable composite material as set forth in claim 1 wherein the two layers of the fabric material are selected from the group consisting of woven threads, unidirectional fibers and random strand mats.

3. A thermoplastic thermoformable composite material as set forth in claim 1 wherein the additional layer of the fabric material is woven.

4. A thermoplastic thermoformable composite material as set forth in claim 3 wherein each of the two fabric layers has a thickness of approximately 8 to 9 thousandths of an inch and the thickness of the additional fabric layer is approximately 4 thousandths of an inch and the total thickness of the thermoformable composite material is approximately 75-80 thousandths of an inch.

5. A thermoplastic thermoformable material as set forth in claim 4 wherein the layers of the thermoplastic material enveloping and impregnating the two layers of the fabric material and the additional layer of the fabric material are formed only from the thermoplastic material.

6. A thermoplastic thermoformable composite material as set forth in claim 1 wherein layers of a thermoplastic material are disposed on the layers of the fabric material and impregnate the layers of the fabric material and are bonded to the layers of the fabric material and to the core of the thermoplastic thermoformable material.

7. A thermoplastic thermoformable composite material for shaping into a complex form without rippling or buckling, including, a layer of a thermoplastic resin material forming a core, two layers of fabric material each disposed on an opposite side of the layer of the thermoplastic resin material and enveloping and impregnating the two layers of fabric material and bonding these layers and bonded to the layer of the thermoplastic resin material, an additional layer of fabric material disposed on one of the two layers of the fabric material and impregnated with the thermoplastic resin material and bonded to the layer of the thermoplastic resin material, the additional layer of fabric material being provided with properties to impart a particular color to one surface of the thermoplastic thermoformable composite sheet, the two layers of the fabric material and the additional layer of the fabric material being provided with a thickness less than the thickness of the thermoplastic resin material, the two layers of the fabric material and the additional layer of the fabric material and producing a stiffness and rigidity of the thermoplastic thermoformable composite sheet and the layer of the thermoplastic resin material providing for a shaping of the thermoplastic composite material into the complex form without rippling or buckling of the thermoplastic composite material.

8. A thermoformable thermoplastic composite sheet as set forth in claim 7, including, the thermoplastic resin material including two layers of thermoplastic resin material each disposed on one of the layers of the fabric material and impregnating the fabric material and bonded to the thermoplastic resin material of the core to form an outer covering for protecting the layers of the fabric material, the two layers of the thermoplastic resin material defining smooth surfaces over the layers of the fabric material.

9. A thermoplastic thermoformable composite material as set forth in claim 8 wherein the thermoplastic resin material is an acrylic.

10. A thermoplastic thermoformable composite material as set forth in claim 8 wherein the additional layer of the fabric material is a woven material defined by a warp and a woof and wherein the warp is defined by a fiber having properties to impart strength to the fabric material and the woof is defined by a fiber imparting the particular color to the one surface of the thermoplastic thermoformable composite material.

11. A thermoplastic thermoformable composite material as set forth in claim 10 wherein the thermoplastic resin material is an acrylic.

12. A thermoformable thermoplastic material as set forth in claim 8 wherein the layers of thermoplastic material enveloping the layers of the fabric material are formed only from the thermoplastic material.

13. A thermoplastic thermoformable composite material, including, a thermoplastic thermoformable resin material defining a core, a first layer of a fabric material positioned on one side of the core, a second layer of a fabric material positioned on the other side of the core, an additional layer of a fabric material positioned on the first layer of the fabric material, the additional layer of the fabric material having a particular color to impart the particular color to the thermoformable thermoplastic composite material, thermoplastic material enveloping the first and second layers of the fabric material and the additional layer of the fabric material and impregnating these layers and bonding these layers to the core, the first and second layers of the fabric material and the additional layer of the fabric material being of a sufficient total thickness to impart strength and rigidity to the thermoplastic thermoformable composite material, the core providing for a shaping of the composite material at an elevated temperature to any desired configuration without any rippling or buckling of the layers of the thermoplastic composite material.

14. A thermoplastic thermoformable composite material as set forth in claim 13, including, the thermoplastic material enveloping and impregnating the layers of the fabric material constituting additional layers of a thermoplastic thermoformable resin material disposed on the outer layers of the fabric material and impregnating the layers of the fabric material and providing a bonding with the core of the thermoplastic thermoformable resin material and providing smooth external surfaces to the thermoplastic thermoformable composite material.

15. A thermoformable thermoplastic composite material as set forth in claim 14, including, the additional layers of the thermoplastic thermoformable resin material being thinner than the core of the thermoformable thermoplastic resin material, and the additional layer of the fabric material constituting a woven fabric having a warp and a woof with sufficient spacing between the warp and the woof to provide for an impregnation of the woven fabric by the thermoplastic resin material.

16. A thermoformable thermoplastic composite material as set forth in claim 15, including, the warp in the additional layer of the fabric material constituting a fiber imparting strength to the fabric material and the woof in the additional layer of the fabric material constituting a fiber imparting the particular color to the thermoformable thermoplastic composite material.

17. A thermoformable thermoplastic composite material as set forth in claim 16 wherein the additional layer of the fabric material constitutes a lame about four thousandths of an inch (0.004") thick.

18. A thermoformable thermoplastic material as set forth in claim 17 wherein the additional layers of the thermoplastic material are formed only from the thermoplastic material.

19. A thermoplastic thermoformable composite material as set forth in claim 14 wherein the total thickness of the first, second and additional layers of fabric material is within a range of approximately five percent (5%) to one third ($\frac{1}{3}$) of the total thickness of the thermoplastic thermoformable composite material.

20. A thermoplastic thermoformable composite material as set forth in claim 19 wherein the first and second layers of fabric material are selected from the group consisting of carbon, glass and aramid and is further selected from the group consisting of woven fibers, unidirectional and chopped fibers and random strand mats.

21. A thermoformable thermoplastic composite material as set forth in claim 13, including, the additional layer of the fabric material constituting a woven fabric having a warp and a woof with sufficient spacing between the warp and the woof to provide for an impregnation of the woven fabric by the thermoplastic resin material.

22. A thermoformable thermoplastic composite material as set forth in claim 21, including, the warp in the additional layer of the fabric material constituting a fiber imparting strength to the fabric material and the woof in the additional layer of the fabric material constituting a fiber imparting the particular color to the thermoformable thermoplastic composite material.

23. A thermoformable thermoplastic composite material as set forth in claim 22 wherein the additional layer of the fabric material constitutes a lame about four thousands of an inch (0.004") thick.

24. A thermoformable thermoplastic material as set forth in claim 21 wherein the additional layers of the thermoplastic material are formed only from the thermoplastic material.

25. A thermoformable thermoplastic material as set forth in claim 21 wherein the additional layers of the thermoplastic material are formed only from the thermoplastic material.

26. A thermoplastic thermoformable composite material as set forth in claim 13 wherein the total thickness of the first, second and additional layers of the fabric material is within a range of approximately five percent (5%) to one third ($\frac{1}{3}$) of the total thickness of the thermoplastic thermoformable composite material.

27. A thermoplastic thermoformable composite material as set forth in claim 26 wherein the first and second layers of fabric material are selected from the group consisting of carbon, glass and aramid and is further selected from the group consisting of woven fibers, unidirectional and chopped fibers and random strand mats.

28. A thermoplastic thermoformable composite material, including, a thermoplastic thermoformable resin material defining a core, a first layer of a fabric material positioned on one side of the core, a second layer of a fabric material positioned on the first layer of the fabric material, the second layer of the fabric material having a particular color to impart the particular color to the thermoplastic thermoformable composite material, thermoplastic material enveloping the first and second layers of the fabric material and impregnating these layers and bonding these layers to the core, the first and second layers of the fabric material imparting strength and rigidity to the composite material, the core providing for a shaping of the thermoplastic composite material at an elevated temperature to any desired configuration without any rippling or buckling of the thermoplastic composite material.

29. A thermoplastic thermoformable composite material as set forth in claim 28, the thermoplastic material enveloping and impregnating the first and second layers of the fabric material including an additional layer of a thermoplastic thermoformable resin material disposed on the second layer of the fabric material and impregnating the first and second layers of the fabric material and providing a bonding to the core and providing a smooth external surface to the composite material.

30. A thermoplastic thermoformable composite material as set forth in claim 29, a second layer of the fabric material being woven and being thinner than the first layer of the fabric material.

31. A thermoplastic thermoformable composite material as set forth in claim 30 wherein the total thickness of the first and second layers of the fabric material is in the order of approximately three percent (3%) to one sixth ($\frac{1}{6}$) of the total thickness of the composite material and wherein the first layer of fabric material is selected from the group consisting of carbon, glass and aramid and is further selected from the group consisting of woven fibers, unidirectional and chopped fibers and random strand mats.

32. A thermoplastic thermoformable composite material as set forth in claim 28,
the second layer of the fabric material being woven and being thinner than the first layer of the fabric material.

33. A thermoplastic thermoformable composite sheet as set forth in claim 28 wherein
the total thickness of the first and second layers of the fabric material is in the order of approximately three percent (3%) to one sixth (1/6) of the total thickness of the composite material.

* * * * *